(12) United States Patent
Yamada

(10) Patent No.: US 8,867,102 B2
(45) Date of Patent: Oct. 21, 2014

(54) COMMUNICATION APPARATUS AND CONTROL METHOD OF COMMUNICATION APPARATUS

(75) Inventor: Masayuki Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 13/107,228

(22) Filed: May 13, 2011

(65) Prior Publication Data

US 2011/0286448 A1    Nov. 24, 2011

(30) Foreign Application Priority Data

May 21, 2010   (JP) ................. 2010-117460

(51) Int. Cl.
*H04N 1/32* (2006.01)
*H04N 1/333* (2006.01)

(52) U.S. Cl.
CPC .... *H04N 1/32112* (2013.01); *H04N 2201/3208* (2013.01); *H04N 2201/3205* (2013.01); *H04N 2201/3274* (2013.01); *H04N 2201/0094* (2013.01); *H04N 2201/3209* (2013.01); *H04N 1/33323* (2013.01); *H04N 2201/33342* (2013.01); *H04N 2201/3223* (2013.01)
USPC ........................................ 358/400

(58) Field of Classification Search
CPC .............. H04N 1/00204; H04N 2201/0074; H04N 2201/3205; H04N 2201/3209; H04N 2201/3274; H04N 1/00209; H04N 1/00214; H04N 1/00217; H04N 1/00236; H04N 1/00238; H04N 1/00244; H04N 1/00281; H04N 1/00312
USPC ............ 370/254–546; 709/201–213; 358/400
See application file for complete search history.

(56) References Cited

U.S. PATENT DOCUMENTS

| | | | |
|---|---|---|---|
| 6,476,935 B1 | 11/2002 | Fujino | |
| 2002/0031139 A1* | 3/2002 | Yoshizawa | 370/419 |
| 2006/0184543 A1* | 8/2006 | Fukuta | 707/10 |
| 2007/0206574 A1* | 9/2007 | Ueda et al. | 370/352 |
| 2007/0223054 A1 | 9/2007 | Endo | |
| 2007/0279700 A1* | 12/2007 | Sakata | 358/402 |
| 2009/0006422 A1* | 1/2009 | Matsuzawa et al. | 707/10 |
| 2009/0055644 A1 | 2/2009 | Miyamoto | |
| 2009/0116056 A1 | 5/2009 | Dokuni | |
| 2010/0302572 A1* | 12/2010 | Suwabe | 358/1.13 |

FOREIGN PATENT DOCUMENTS

| | | |
|---|---|---|
| CN | 101431590 A | 5/2009 |
| JP | 07-250203 A | 9/1995 |
| JP | 08-079426 A | 3/1996 |
| JP | 10-126563 A | 5/1998 |
| JP | 2003-051927 A | 2/2003 |

* cited by examiner

*Primary Examiner* — Ayaz Sheikh
*Assistant Examiner* — Debebe Asefa
(74) *Attorney, Agent, or Firm* — Canon USA, Inc., IP Division

(57) ABSTRACT

There is provided a communication apparatus for preventing re-transmission to the address associated with a predetermined communication system. The communication apparatus deletes the stored address information after the transmission instruction is received and a transmission process according to the transmission instruction is ended if the stored address information is associated with a predetermined communication system, and the communication apparatus keeps storing the stored address information even after the transmission instruction is received and the transmission process according to the transmission instruction is ended if the stored address information is associated with another communication system.

54 Claims, 18 Drawing Sheets

FIG.4

ADDRESS INFORMATION

| IndexID | Name | Type | Address |
| --- | --- | --- | --- |
| 1 | PRINTER1/XXX Inc/JP | print | printer1.xxx.co.jp |
| 2 | PRINTER2/XXX Inc/JP | print | printer2.xxx.co.jp |
| 3 | FAX1/XXX Inc/JP | fax | 012-345-6789 |
| 4 | FAX2/XXX Inc/JP | fax | 987-654-3210 |
| 5 | DB1/XXX Inc/JP | database | db1.xxx.co.jp/folder1 |
| 6 | | | |
| 7 | DB3/XXX Inc/JP | database | db3.xxx.co.jp/folder1 |
| 8 | USER1/XXX Inc/JP | mail | user1@.xxx.co.jp |
| 9 | USER2/XXX Inc/JP | mail | user2@.xxx.co.jp |
| 10 | USER3/XXX Inc/JP | mail | user3@.xxx.co.jp |
| 11 | | | |
| 12 | USER5/XXX Inc/JP | mail | user5@.xxx.co.jp |
| 13 | USER6/XXX Inc/JP | mail | user6@.xxx.co.jp |
| 14 | USER7/XXX Inc/JP | mail | user7@.xxx.co.jp |
| 15 | | mail | |
| 16 | USER9/XXX Inc/JP | mail | user9@.xxx.co.jp |
| ⋮ | ⋮ | ⋮ | ⋮ |
| 998 | IFAX1/XXX Inc/JP | ifax | ifax1@.xxx.co.jp |
| 999 | | | |
| 1000 | IFAX3/XXX Inc/JP | ifax | ifax3@.xxx.co.jp |

FIG.18

RELIABLE ADDRESS SETTING

INPUT RELIABLE ADDRESS

[              ]  ADD

RELIABLE ADDRESS

| abc.co.jp |
| abc@xyz.co.jp |

DELETE

COMMUNICATION APPARATUS AND CONTROL METHOD OF COMMUNICATION APPARATUS

BACKGROUND OF THE INVENTION

1. Field of the Invention

The present invention relates to a communication apparatus and a control method of the communication apparatus.

2. Description of the Related Art

In a communication apparatus for transmitting image data to an external device, Japanese Patent Application Laid-Open No. 2003-51927 discusses a technique in which an address is stored, after the transmission of image data is ended, to transmit the image data to the same address again.

According to Japanese Patent Application Laid-Open No. 2003-51927, in the communication apparatus which can execute a transmission process using any of a facsimile communication system, an electronic mail communication system, and a plurality of communication systems, an address is stored to transmit image data to the same address as that of the previous transmission.

SUMMARY OF THE INVENTION

The present invention is directed to a communication apparatus and a control method of the communication apparatus capable of storing an address so that image data is transmitted to the same address as that of the previous transmission and preventing the image data from being erroneously transmitted to the address associated with a predetermined communication system.

According to an aspect of the present invention, a communication apparatus includes an input unit configured to input image data, a transmission unit configured to transmit the image data input by the input unit and be capable of executing a transmission process using any of a plurality of communication systems, a storage unit configured to store address information which is used for identifying an address to which the transmission unit transmits the image data and associated with any of the plurality of communication systems, a reception unit configured to receive a transmission instruction to cause the transmission unit to transmit the image data input by the input unit based on the address information stored in the storage unit, and a control unit configured to control the transmission unit to transmit the image data input by the input unit in response to the reception of the transmission instruction, based on the address information stored in the storage unit, and using the communication system associated with the address information, wherein the storage unit deletes the stored address information after the transmission instruction is received by the reception unit and the transmission process according to the transmission instruction is ended if the stored address information is associated with a predetermined communication system, and the storage unit keeps storing the stored address information even after the transmission instruction is received by the reception unit and the transmission process according to the transmission instruction is ended if the stored address information is associated with another communication system different from the predetermined communication system.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is an address information management table managed by an address management component 3002.

FIG. 18 illustrates a screen for registering a reliable address.

DESCRIPTION OF THE EMBODIMENTS

Figure 1:
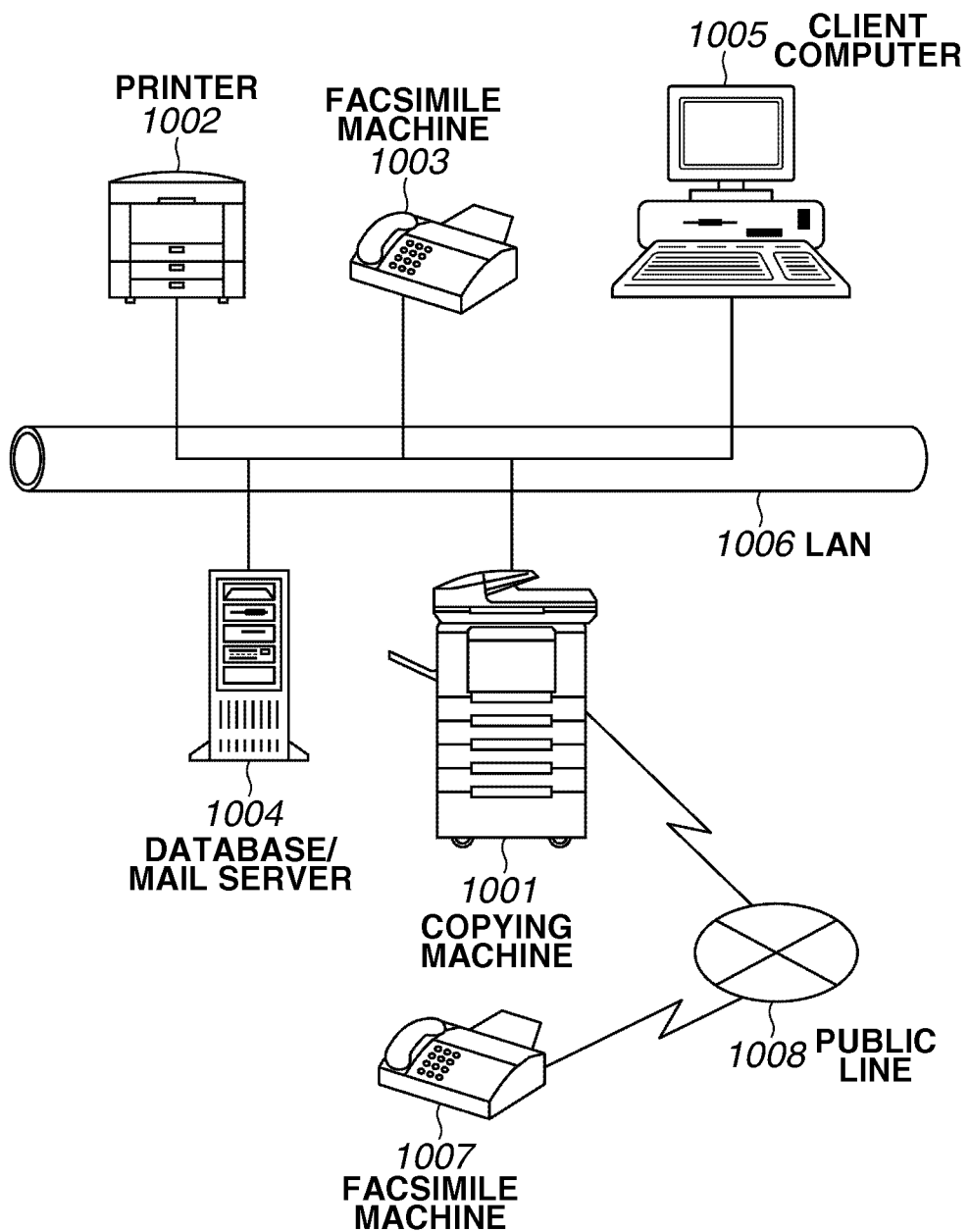
FIG. 1 is a schematic diagram illustrating a configuration of a network.

Various exemplary embodiments, features, and aspects of the invention will be described in detail below with reference to the drawings.

The same components are given the same reference numerals and further description thereof is omitted.

Constitutional blocks required for the present exemplary embodiment are described below and then a detailed process is described.

FIG. 1 is a schematic diagram illustrating a configuration of a network containing a communication apparatus according to a first exemplary embodiment of the present invention. In the present exemplary embodiment, a copying machine having a facsimile function and a data transmission function as a communication apparatus is described.

As illustrated in FIG. 1, a copying machine 1001 is connected to a LAN 1006 of the Ethernet (registered trademark) along with a printer 1002, a facsimile machine 1003, a database/mail server 1004, and a client computer 1005. Furthermore, the copying machine 1001 is connected to a public line 1008 along with a facsimile machine 1007.

The copying machine 1001 has not only a copy function and a facsimile function but also a data transmission function of reading an image on a document and transmitting the read image data to each apparatus on the LAN 1006. The printer 1002 is capable of receiving data read by the copying machine 1001 and transmitting the received data via the LAN 1006.

The facsimile machine 1003 is capable of receiving data read by the copying machine 1001 and transmitting the received data via the LAN 1006. The database/mail server 1004 is a server apparatus with a function of receiving data read by the copying machine 1001 via the LAN 1006, storing the received data, and transmitting data as an electronic mail.

The client computer 1005 is connected to the database/mail server 1004 and capable of acquiring a desired data from the database/mail server 1004 and displaying the data thereon. The client computer 1005 is also capable of receiving the data read by the copying machine 1001 via the LAN 1006, and processing and editing the received data.

The facsimile machine 1007 is capable of receiving the data read by the copying machine 1001 via the public line 1008 and printing the received data.

Figure 2:
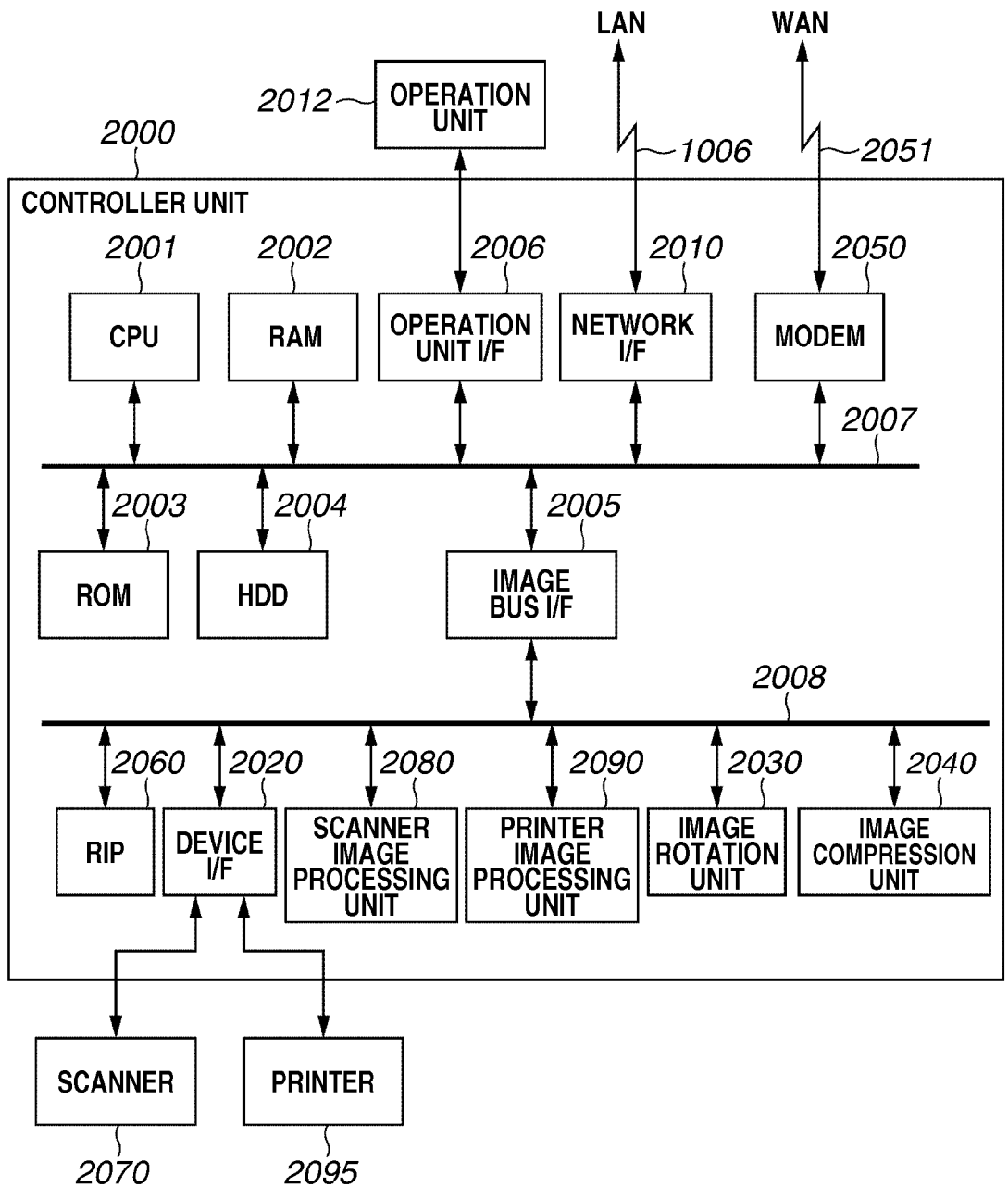
FIG. 2 is a block diagram illustrating a configuration of the principal part of a copying machine 1001.

The configuration of the principal part of the copying machine 1001 is described below with reference to FIG. 2. FIG. 2 is a block diagram illustrating the configuration of the principal part of the copying machine 1001 in FIG. 1.

As illustrated in FIG. 2, the copying machine 1001 is equipped with a controller unit 2000 connected to a scanner 2070 and a printer 2095. The controller unit 2000 performs control for realizing a copy function in which the image data read by the scanner 2070 is printed by the printer 2095, and connect the copying machine 1001 with a LAN 1006 and a public line (WAN) 2051. Thereby, the copying machine 1001 performs control for inputting and outputting image information and device information.

The controller unit 2000 includes a CPU 2001 which boots an operation system (OS) using a boot program stored in a ROM 2003. An application program stored in a hard disk drive HDD) 2004 is executed on the OS to execute various processing operations.

A RAM 2002 is used as a work area of the CPU 2001. The RAM 2002 provides not only a work area, but also an image memory area for temporarily storing image data. The HDD 2004 stores image data with an application program.

The CPU 2001 is connected to the ROM 2003 and the RAM 2002 via a system bus 2007. The CPU 2001 is also connected to an operation unit interface (operation unit I/F) 2006, a network interface (network I/F) 2010, a modem 2050, and an image bus interface (image bus I/F) 2005.

The operation unit I/F 2006 is an interface with an operation unit 2012 having a touch panel, and outputs image data to be displayed on the operation unit 2012 to the operation unit 2012. The operation unit I/F 2006 sends information input by a user through the operation unit 2012 to the CPU 2001.

The network I/F 2010 is connected to the LAN 1006 and exchanges information with each apparatus on the LAN 1006 via the LAN 1006. The modem 2050 is connected to the public line 2051 and exchanges information via the public line 2051.

The image bus I/F 2005 is a bus bridge for connecting the system bus 2007 with an image bus 2008 for transferring image data at a high speed to convert data structure. The image bus 2008 is composed of a PCI bus or an IEEE1394. On the image bus 2008 are provided a raster image processor (hereinafter referred to as RIP) 2060, a device I/F 2020, a scanner image processing unit 2080, a printer image processing unit 2090, an image rotation unit 2030, and an image compression unit 2040.

The RIP 2060 is a processor for rasterizing a PDL code into a bit map image. The device I/F 2020 is connected to the scanner 2070 and the printer 2095 to perform synchronous/asynchronous conversion of image data. The scanner image processing unit 2080 subjects input image data to correction, processing, and editing.

The printer image processing unit 2090 subjects print input image data to the correction of a printer and the conversion of resolution. The image rotation unit 2030 rotates image data.

The image compression unit 2040 compresses multi-valued image data into JPEG data and binary image data to JBIG, MMR, or MH data and performs the decompression process thereof.

The configuration of the operation unit 2012 illustrated in FIG. 1 is described below with reference to FIGS. 5A and 5B.

Figure 5A:
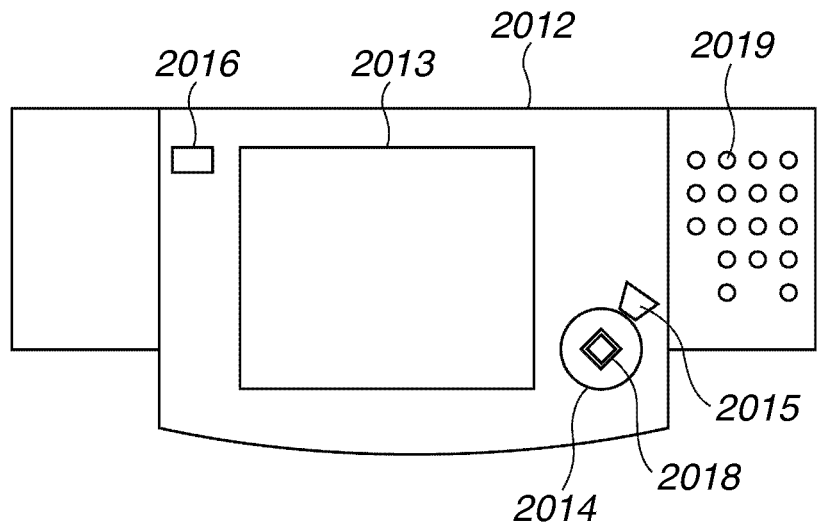
FIGS. 5A and 5B illustrate a configuration of an operation unit 2012.
Figure 5B:
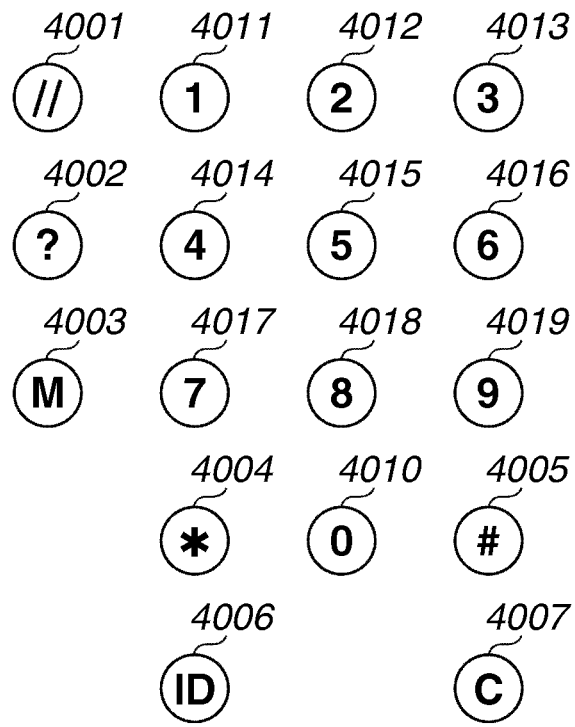

FIG. 5A is a plan view illustrating the configuration of the operation unit 2012 illustrated in FIG. 1.

An LCD display unit 2013 is configured such that a touch panel sheet is stuck on an LCD. The LCD display unit 2013 displays the operation screen of the copying machine 1001. When a key displayed on the operation screen is pressed by an operator (user) of the copying machine 1001, the LCD display unit 2013 informs the CPU 2001 of the controller unit 2000 of information about position thereof.

A start key 2014 is used to start an operation of reading a document image. At the center portion of the start key 2014 is provided with a green and red LED 2018, and the color thereof indicates a state as to whether the start key 2014 can be used.

A stop key 2015 is operated to stop the operation. A menu key 2016 is operated to display a menu. A numeric keypad 2019 includes numeric keys from a zero key 4010 to a nine key 4019 as illustrated in detail in FIG. 5B.

The numeric keypad 2019 further includes a reset key 4001, a guide key 4002, a user mode key 4003, an asterisk (*) key 4004, a pound sign (#) key 4005, an ID key 4006, and a clear (C) key 4007. Pressing each key causes the operation unit I/F 2006 to generate a predetermined key code, and to display a screen according to the key code on a screen in operation via the system bus 2007.

The data transmission function of the copying machine 1001 is described below with reference to FIGS. 3 and 4.

Figure 3:
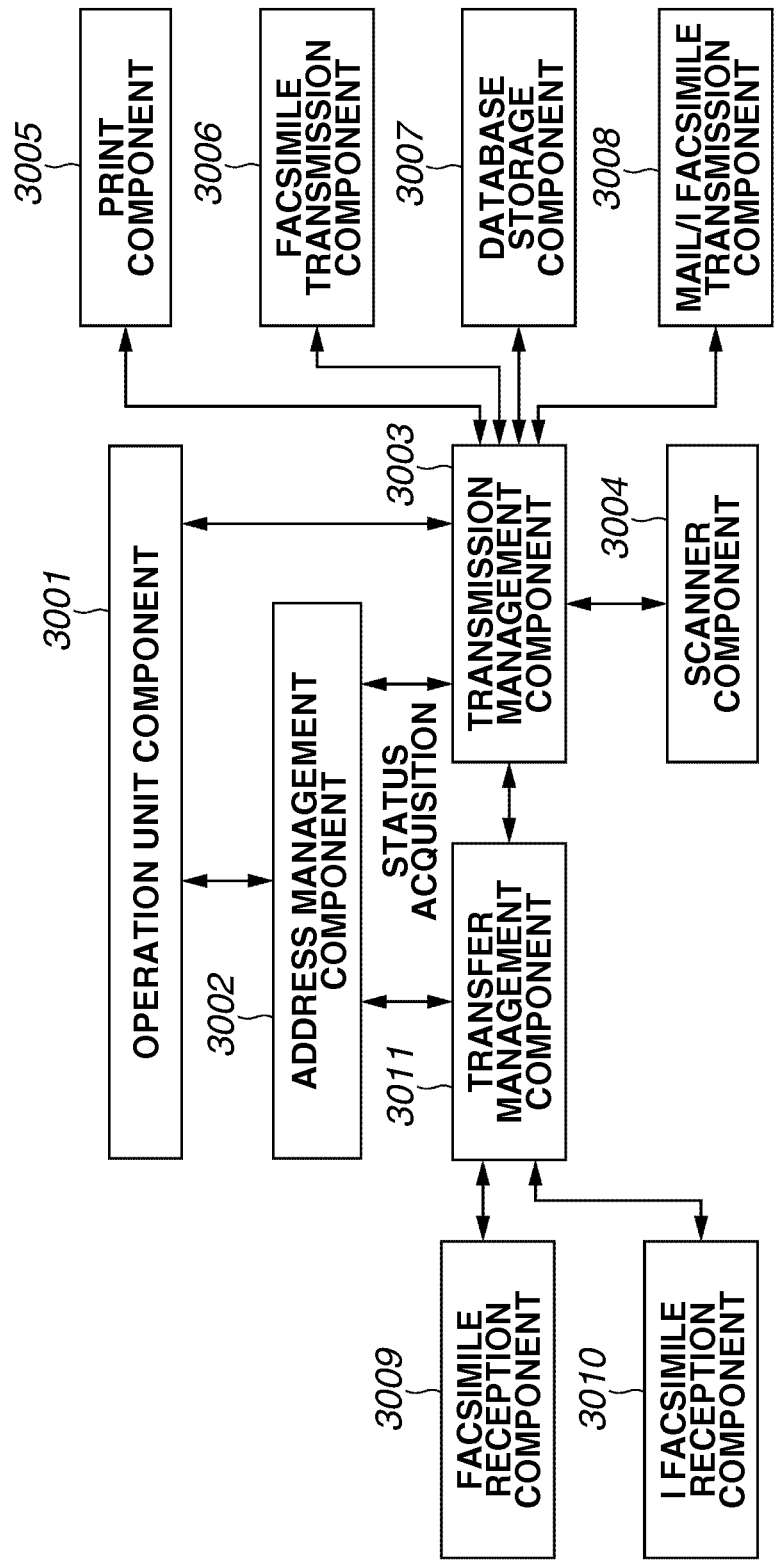
FIG. 3 illustrates functional blocks of a configuration of software.

FIG. 3 illustrates functional blocks of software for realizing the facsimile and the data transmission function of the copying machine 1001 illustrated in FIG. 1. FIG. 4 illustrates an address information management table managed by an address management component 3002 in FIG. 3.

The facsimile function and the data transmission function of the copying machine 1001 are realized by the CPU 2001 executing the application program stored in the HDD 2004. The functional blocks of the data transmission function realized by the execution include an operation unit component 3001, the address management component 3002, a transmission management component 3003, and a transfer management component 3011, as illustrated in FIG. 3.

The address management component 3002 stores and manages a management table in which address information for identifying an address (apparatus on the LAN 1006) to which data is transmitted via the network I/F 2010 and an address (apparatus on the public line) to which data is transmitted via the modem 2050 is written.

Specifically, the management table is the one whose contents can be rewritten by the user inputting via the operation unit 2012, and is stored in the HDD 2004. As illustrated in FIG. 4, a management number (Index ID), an address name (Name), communication type (Type), and transmission address (Address) are written in the management table.

The communication type (Type) in the table indicates the attribute of a transmission job. In the present exemplary embodiment, "fax," "print," "database," and "mail" or "ifax" represent a facsimile job, a print job, a database job, and an electronic mail/I facsimile job, respectively.

The operation unit component 3001 acquires address information from the address management component 3002 and displays the acquired information on the operation unit 2012.

The transmission management component 3003 is connected to a scanner component 3004, a print component 3005, a facsimile transmission component 3006, a database storage component 3007, and a mail/I facsimile transmission component 3008. The scanner component 3004 controls the operation of the scanner 2070 based on a process command issued from the transmission management component 3003.

The facsimile transmission component 3006 controls a data transmission operation via the modem 2050 based on a process command issued from the transmission management component 3003. The print component 3005 controls the operation of transmitting data to the printer 1002 via the network I/F 2010 based on a process command issued from the transmission management component 3003.

The database storage component 3007 controls the operation of transmitting data to the database/mail server 1004 via the network I/F 2010 based on a process command issued from the transmission management component 3003. The mail/I facsimile transmission component 3008 controls the operation of transmitting data to the database/mail server 1004 via the network I/F 2010 based on a process command issued from the transmission management component 3003.

The transmission management component 3003 issues a process command to each of the components 3005 to 3008 based on address information selected by the operation unit component 3001.

When the address of a facsimile job is selected using the operation unit component 3001, for example, the transmission management component 3003 issues a process command for the scanner component 3004 to read a document image.

The transmission management component 3003 issues a process command for the facsimile transmission component 3006 to transmit the read image data to the selected address by facsimile. Thereby, the image data read by the scanner 2070 are transmitted to the facsimile machines 1003 and 1007.

When the address of a print job, a database job, or an electronic mail/I facsimile job are selected by using the operation unit component 3001, a process command is issued to the print component 3005, the database storage component 3007, or the mail/I facsimile transmission component 3008.

The image data read by the scanner 2070 is transmitted from the print component 3005, the database storage component 3007, or the mail/I facsimile transmission component 3008 to the printer 1002 or the database/mail server 1004.

The facsimile image and the I facsimile image transmitted from the facsimile machine 1003 and the client computer 1005 are received by the facsimile reception component 3009 and an I facsimile reception component 3010 via the network I/F 2010 respectively.

The received facsimile image and I facsimile image are transferred to the transmission management component 3003 by the transfer management component 3011 based on information of the address management component 3002.

The facsimile image transmitted from the facsimile machine 1007 is received by the facsimile reception component 3009 via the modem 2050. The received facsimile image is transferred to the transmission management component 3003 by a transfer management component 3011 based on information of the address management component 3002.

The transmission process executed by the facsimile transmission component 3006, the database storage component 3007, and the mail/I facsimile transmission component 3008 is described below.

Figure 6:
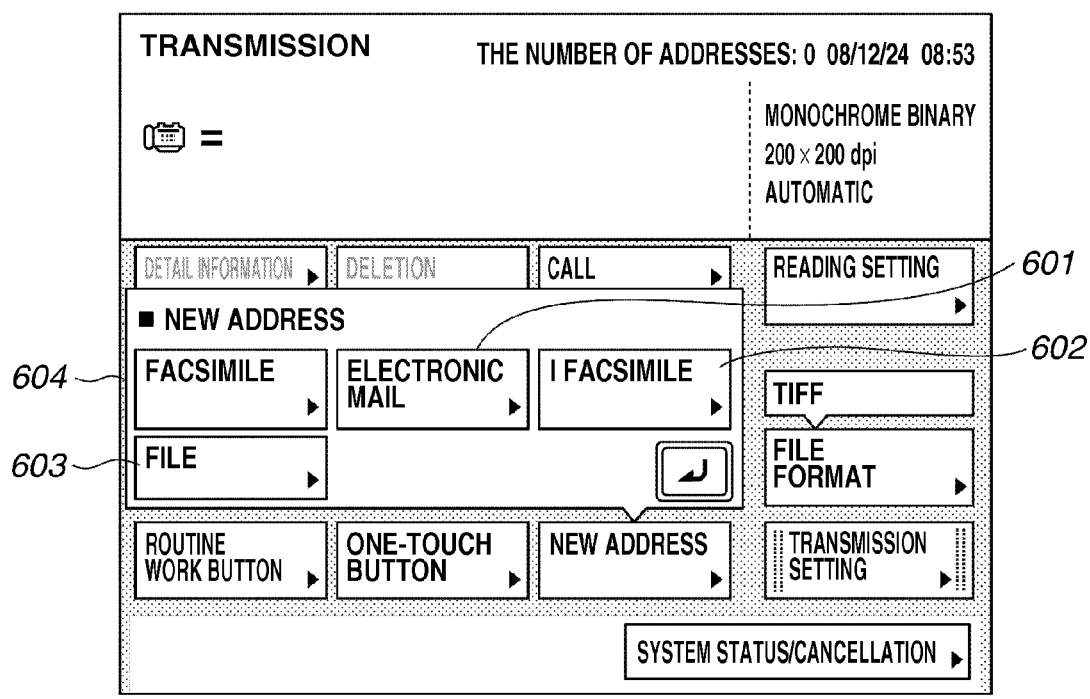
FIG. 6 illustrates a screen displayed on an LCD display unit 2013 of the operation unit 2012.

FIG. 6 illustrates a screen displayed on the LCD display unit 2013 of the operation unit 2012. On the screen illustrated in FIG. 6 are displayed an electronic mail button 601, an I facsimile button 602, a file button 603, and a facsimile button 604.

If any of the buttons 601 to 604 is specified by the user, the operation unit component 3001 notifies the transmission management component 3003 of the communication system corresponding to the specified button. The transmission management component 3003 recognizes the communication system of which the operation unit component 3001 notifies the transmission management component 3003 and starts the component corresponding to the communication system.

The process executed by the operation unit component 3001, the transmission management component 3003, and the facsimile transmission component 3006 in a case where the facsimile button 604 is specified by the user on the screen in FIG. 6 is described below with reference to a flow chart illustrated in FIG. 7.

Figure 8:
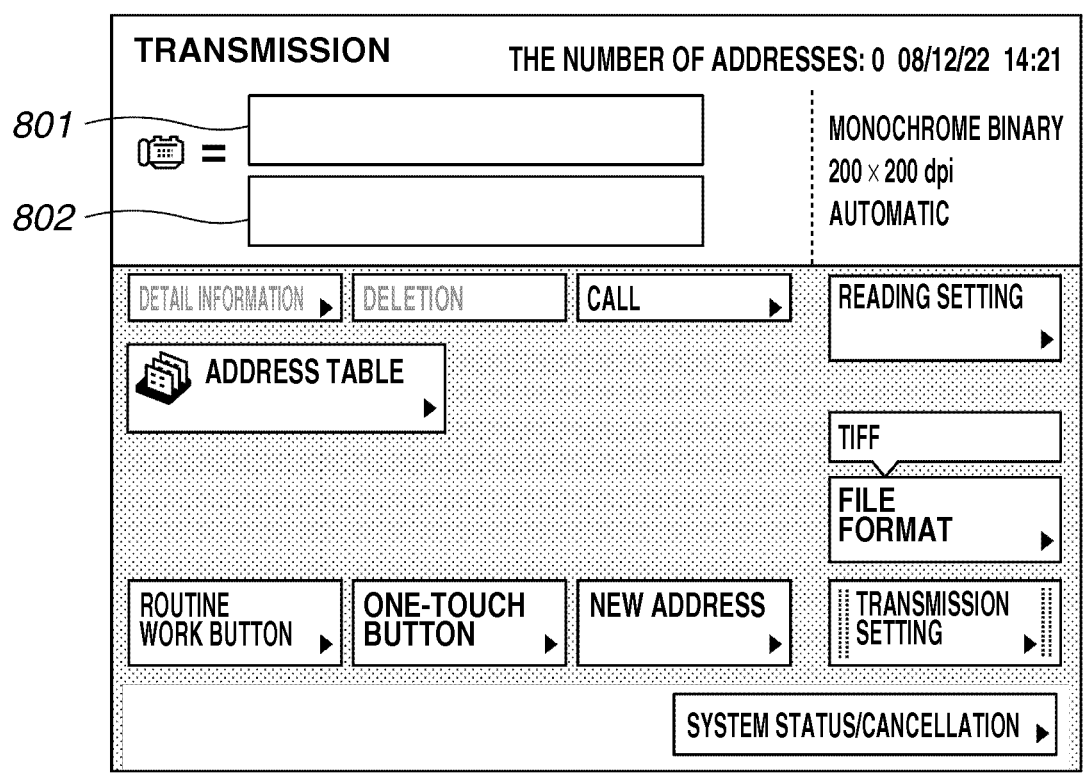
FIG. 8 illustrates a screen for a facsimile.

In a case where the facsimile button 604 is specified by the user, the LCD display unit 2013 displays a facsimile screen illustrated in FIG. 8.

In step S701, the operation unit component 3001 determines whether a key input is performed by the user of the copying machine 1001. If the operation unit component 3001 determines that a key input is performed (YES in step S701), the processing proceeds to step S702.

In step S702, the operation unit component 3001 determines whether the input key is the menu key 2016. If the operation unit component 3001 determines that the input key is the menu key 2016 (YES in step S702), the processing in FIG. 7 is ended. If the operation unit component 3001 determines that the input key is not the menu key 2016 (NO in step S702), the processing proceeds to step S703.

In step S703, the operation unit component 3001 determines whether the input key is a numeric key. If the operation unit component 3001 determines that the input key is the numeric key (YES in step S703), the processing proceeds to step S704. If the operation unit component 3001 determines that the input key is not the numeric key (NO in step S703), the processing proceeds to step S705.

In step S704, the operation unit component 3001 notifies the facsimile transmission component 3006 of the numeric value corresponding to the numeric key input in step S703 via the transmission management component 3003. The facsimile transmission component 3006 adds the numeric value of which the operation unit component 3001 notifies the facsimile transmission component 3006 to the end of a transmission address number 901 illustrated in FIG. 9.

The transmission address number 901 is stored in the RAM 2002. In a case where the transmission address number stored in the transmission address number 901 is "123" and the numeric value corresponding to the numeric key input in step S703 is "4," for example, "1234" is newly stored as the transmission address number in the transmission address number 901. The transmission address number stored in the transmission address number 901 is displayed on 801 in FIG. 8.

In step S705, the operation unit component 3001 determines whether the input (received) key is a start key 2014. If the operation unit component 3001 determines that the input key is the start key 2014 (YES in step S705), the processing proceeds to step S706. If the operation unit component 3001 determines that the input key is not the start key 2014 (NO in step S705), the process corresponding to the input key is executed in step S710.

In step S706, the facsimile transmission component 3006 determines whether a facsimile can be transmitted. If the facsimile transmission component 3006 determines that a facsimile can be transmitted (YES in step S706), the processing proceeds to step S707. More specifically, the facsimile transmission component 3006 determines whether the transmission address number 901 does not store any numeric value (empty). If no numeric value is stored, the facsimile transmission component 3006 determines that a facsimile cannot be transmitted.

Other information may be used as a condition for determining whether a facsimile can be transmitted. It can be determined that a facsimile cannot be transmitted in a case where a document is not placed on the scanner 2070, for example. Alternatively, the state of the modem 2050 is determined and if the modem 2050 is not connected to the public line 1008, it can be determined that a facsimile cannot be transmitted.

In step S707, the facsimile transmission component 3006 instructs the scanner component 3004 to cause the scanner 2070 to read a document via the transmission management component 3003. The scanner 2070 reads the document to acquire image data and causes the image buffer 902 of the RAM 2002 to store the acquired image data.

In step S708, the facsimile transmission component 3006 controls the modem 2050 in such a manner that the image compression unit 2040 compresses the image data stored in the image buffer 902 to the image data in a facsimile format and transmits the compressed data to the transmission address number 901.

In step S709, the facsimile transmission component 3006 controls the RAM 2002 in such a manner that the transmission address number 901 stored in the RAM 2002 is deleted from the RAM 2002. This allows preventing image data from being transmitted again to the address to which the data have already transmitted when image data is transmitted to the address information (transmission address number) associated with the facsimile communication system by inputting again the start key 2014.

Therefore, the image data which have to be made secret can be prevented from being leaked outside a company due to the erroneously transmission of image data to the same address as that of the previous transmission.

The process executed by the operation unit component 3001, the transmission management component 3003, and the mail/I facsimile transmission component 3008 in a case where the electronic mail button 601 is specified by the user on the screen illustrated in FIG. 6 is described below with reference to a flow chart illustrated in FIG. 11.

Figure 10:
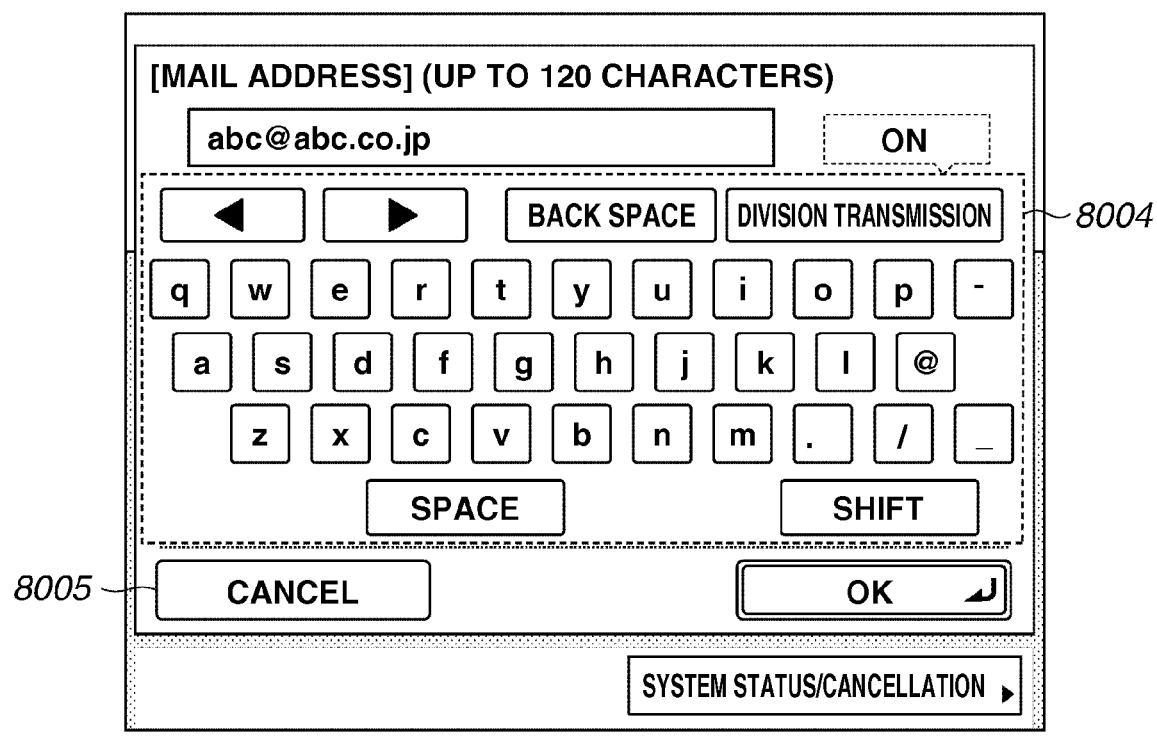
FIG. 10 is an input screen for a mail address.

In a case where the electronic mail button 601 is specified by the user on the screen in FIG. 6, a mail address input screen 8004 illustrated in FIG. 10 is displayed on the LCD display unit 2013.

Also in a case where the I facsimile button 602 is specified by the user on the screen in FIG. 6, the mail address input screen 8004 illustrated in FIG. 10 is displayed. The process executed by the operation unit component 3001, the transmission management component 3003, and the mail/I facsimile transmission component 3008 in a case where the I facsimile button 602 is specified by the user on the screen in FIG. 6 is similar to that in FIG. 11, so that further description thereof is omitted herein.

In step S1101, the operation unit component 3001 determines whether a key input is performed by the user of the copying machine 1001. If the operation unit component 3001 determines that a key input is performed (YES in step S1101), the processing proceeds to step S1102.

In step S1102, the operation unit component 3001 determines whether the input key is a cancel key 8005. If the operation unit component 3001 determines that the input key is the cancel key 8005 (YES in step S1102), the processing in FIG. 11 is ended. If the operation unit component 3001 determines that the input key is not the cancel key 8005 (NO in step S1102), the processing proceeds to step S1103.

In step S1103, the operation unit component 3001 determines whether the input key is a soft key. If the operation unit component 3001 determines that the input key is the soft key (YES in step S1103), the processing proceeds to step S1104. If the operation unit component 3001 determines that the input key is not the soft key (NO in step S1103), the processing proceeds to step S1105.

The soft key refers to buttons such as "a", "b", "@", and others displayed on the mail address input screen 8004 illustrated in FIG. 10. The user presses these buttons to cause the operation unit component 3001 to notify the mail/I facsimile transmission component 3008 of the code corresponding to the pressed button ("a" for example) via the transmission management component 3003.

In step S1104, the operation unit component 3001 notifies the mail/I facsimile transmission component 3008 of the code corresponding to the soft key input in step S1103 via the transmission management component 3003.

Figure 9:
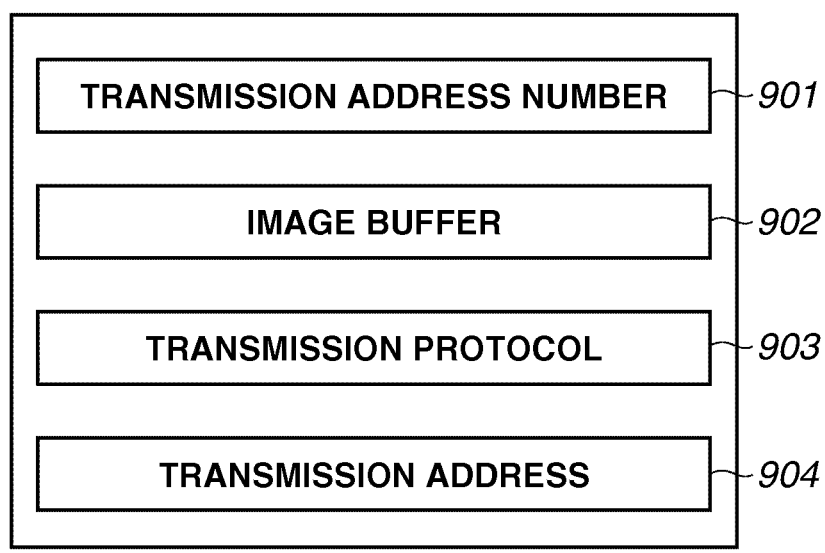
FIG. 9 illustrates data stored in a RAM 2002.

The mail/I facsimile transmission component 3008 adds the code of which the operation unit component 3001 notifies the mail/I facsimile transmission component 3008 to the end of a transmission address 904 illustrated in FIG. 9. The transmission address 904 is stored in the RAM 2002.

In a case where the transmission address stored in the transmission address 904 is "abc@abc.co.jp" and the code corresponding to the soft key input in step S1103 is "p," for example, "abc@abc.co.jp" is stored as the transmission address in 904. The transmission address stored in the transmission address 904 is displayed on field 802 in FIG. 8.

Figure 7:
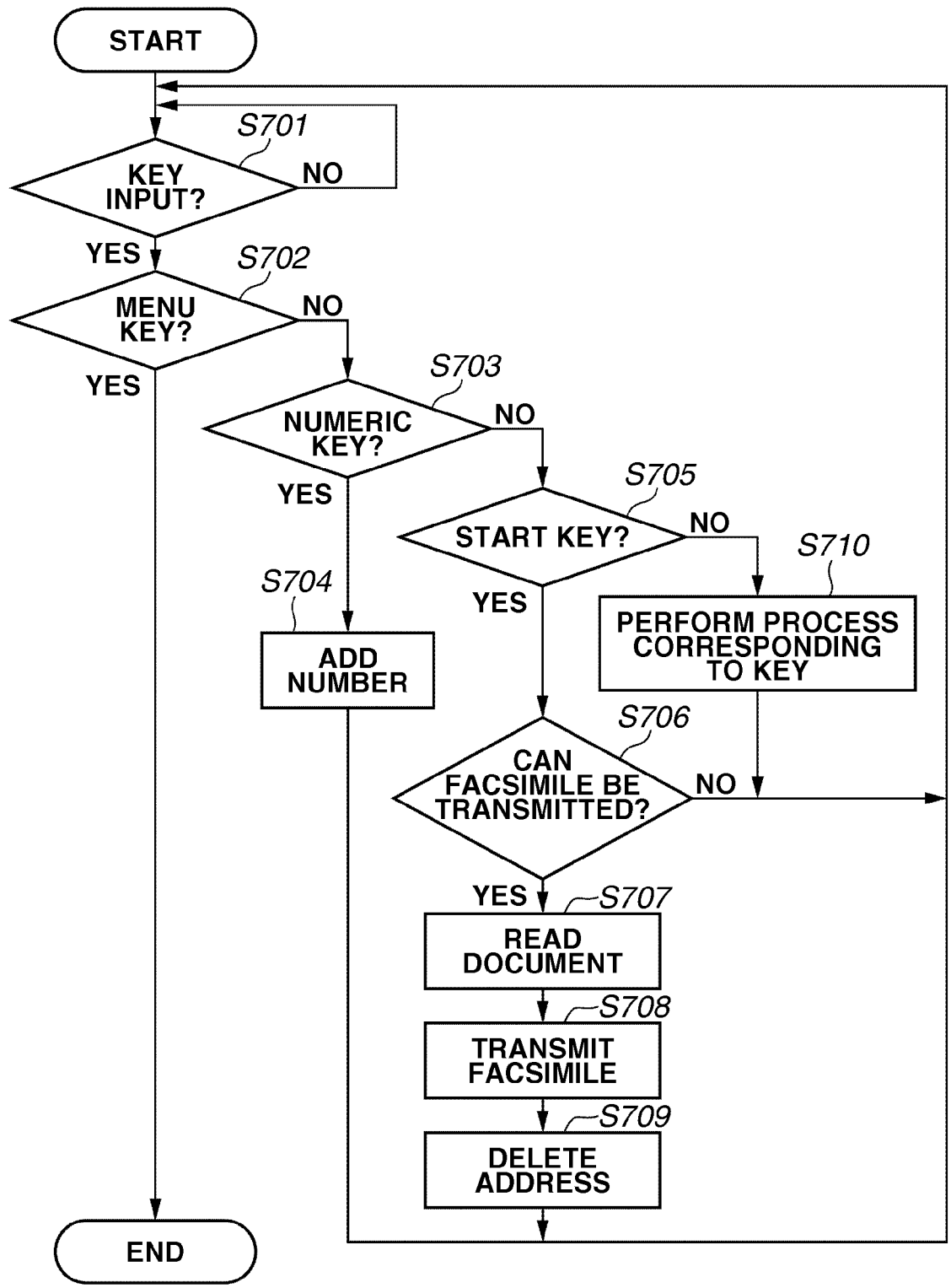
FIG. 7 is a flow chart executed in a case where a facsimile button 604 is specified by a user.

The flow chart in FIG. 7 is executed to display the transmission address number 901 on field 801 in FIG. 8 if the transmission address number 901 is already stored. The user inputs the start key 2014 with the transmission address displayed on both fields 801 and 802 in FIG. 8 to simultaneously transmit the image data acquired by the scanner 2070 in both the facsimile and the electronic mail communication system. In other words, a multi-address transmission is performed to a plurality of addresses corresponding to a plurality of communication systems.

In step S1105, the operation unit component 3001 determines whether the input key is the start key 2014. If the operation unit component 3001 determines that the input key is the start key 2014 (if transmission instruction is received) (YES in step S1105), the processing proceeds to step S1106. If the operation unit component 3001 determines that the input key is not the start key 2014 (NO in step S1105), the process corresponding to the input key is executed in step S1109.

In step S1106, the mail/I facsimile transmission component 3008 determines whether an electronic mail can be transmitted. If the mail/I facsimile transmission component 3008 determines that an electronic mail can be transmitted (YES in step S1106), the processing proceeds to step S1107. More specifically, the mail/I facsimile transmission component 3008 determines whether the transmission address 904 stored in the RAM 2002 does not store any code (empty). If no code is stored, the mail/I facsimile transmission component 3008 determines that an electronic mail cannot be transmitted.

Other information may be used as a condition for determining whether an electronic mail can be transmitted. It can be determined that an electronic mail cannot be transmitted in a case where a document is not placed on the scanner 2070, for example. Alternatively, the state of the network I/F 2010 is determined and if the network I/F 2010 is not connected to the LAN 1006, it can be determined that an electronic mail cannot be transmitted.

In step S1107, the mail/I facsimile transmission component 3008 instructs the scanner component 3004 to cause the scanner 2070 to read a document via the transmission management component 3003. The scanner 2070 reads the document to acquire image data and causes the image buffer 902 of the RAM 2002 to store the acquired image data.

In step S1108, the mail/I facsimile transmission component 3008 causes the image compression unit 2040 to compress the image data stored in the image buffer 902 to the image data in a predetermined format (PDF format, for example) and transmits the compressed data to the transmission address 904.

The image data is transmitted as a file attached to an electronic mail. The image compression unit 2040 may be controlled so that the user can optionally select the format of an attached file such as PDF, JPEG, and others and change data to those in the selected format.

Figure 11:
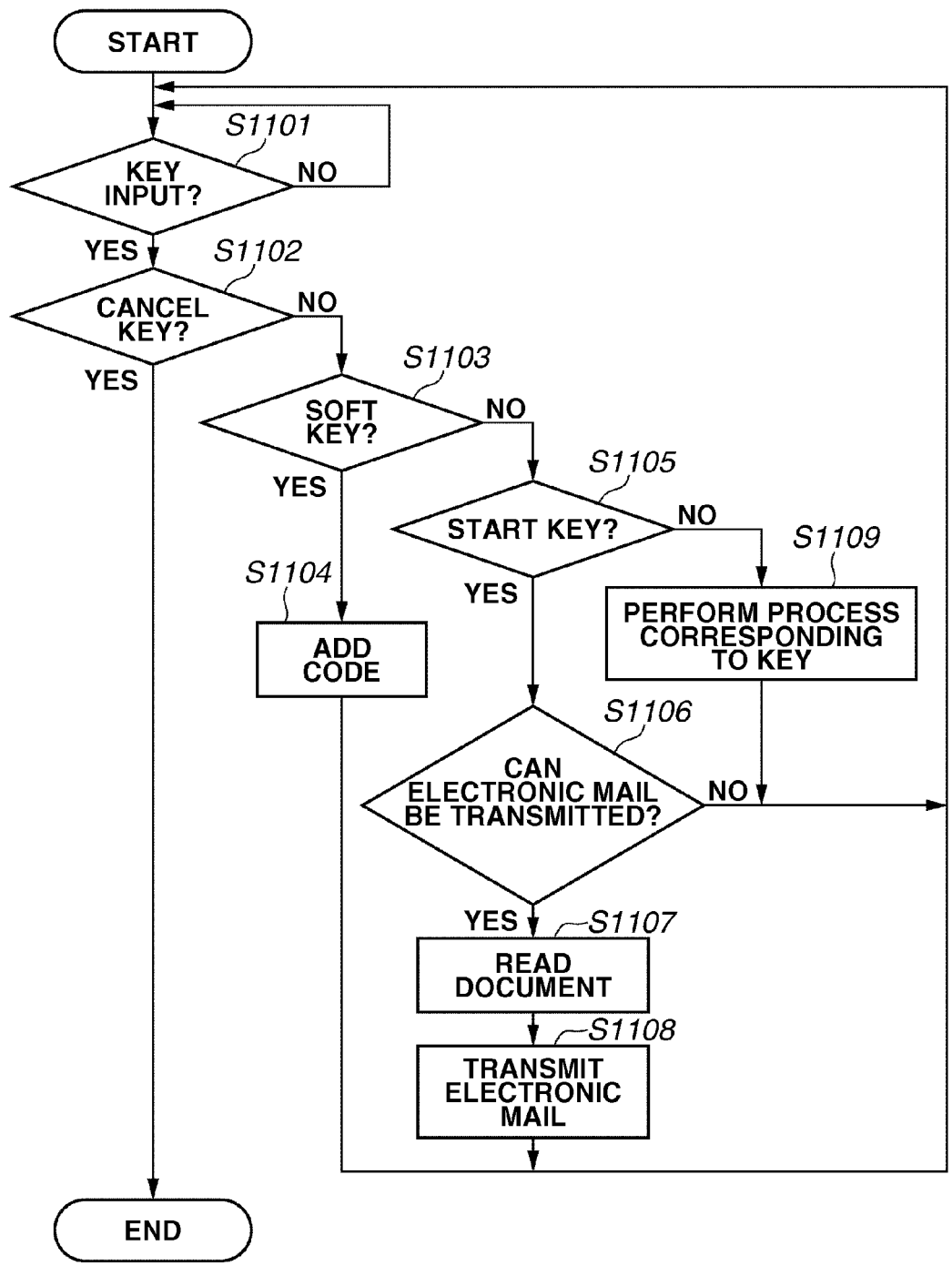
FIG. 11 is a flow chart executed in a case where an electronic mail button 601 is specified by the user.

In the transmission process in the facsimile communication system by the facsimile transmission component 3006, although the transmission address number 901 in the RAM 2002 is deleted after a facsimile is transmitted, such deletion is not performed in the process in FIG. 11. For this reason, if the processing is returned again to step S1101 from step S1108 and the start key 2014 is input, an electronic mail can be transmitted to the transmission address 904 which is kept stored even after the transmission process is ended.

The reason the electronic mail communication system is configured not to delete the transmission address 904 is that communication using the electronic mail communication system can prevent an electronic mail from being transmitted to an address inappropriate for destination by an in-house mail server restricting transmission (only to a predetermined address, for example).

The process executed by the operation unit component 3001, the transmission management component 3003, and the database storage component 3007 in a case where the file button 603 is specified by the user on the screen in FIG. 6 is described below with reference to a flow chart illustrated in FIG. 12.

Figure 13:
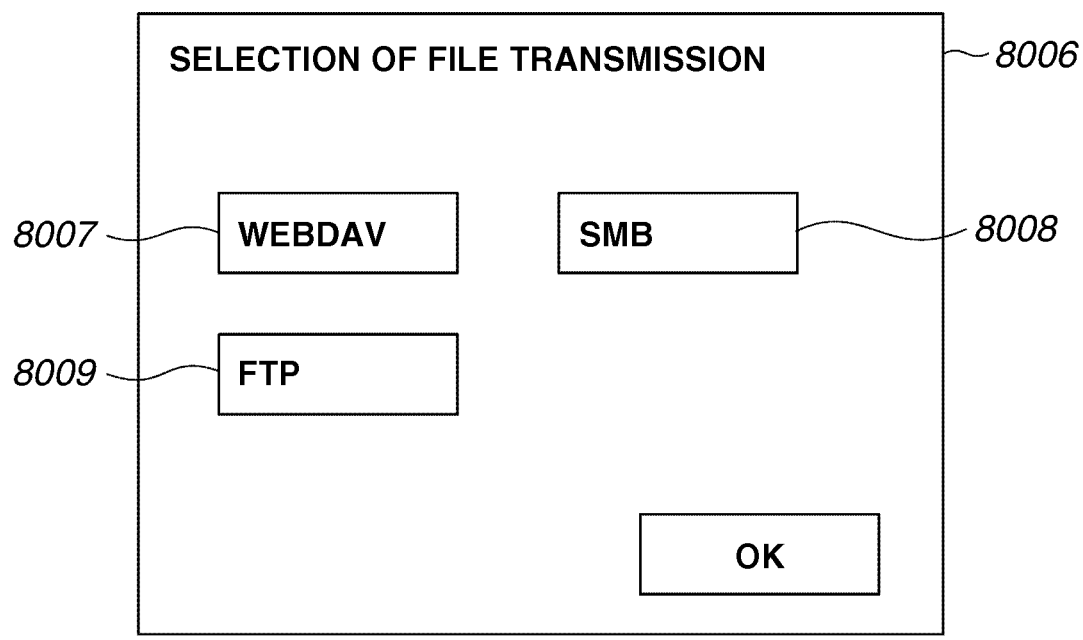
FIG. 13 illustrates a transmission protocol selection screen.

In a case where the file button 603 is specified by the user on the screen in FIG. 6, a transmission protocol selection screen 806 illustrated in FIG. 13 is displayed on the LCD display unit 2013.

In step S1200, the operation unit component 3001 receives the selection of a transmission protocol by the user of the copying machine 1001. A transmission protocol can be selected from any of a Web-based Distributed Authoring and Versioning (WEBDAV) 8007, a Server Message Block (SMB) 8008, and a File Transfer Protocol (FTP) 8009. The transmission protocol selected by the user is stored as a transmission protocol 903 in the RAM 2002.

Figure 14:
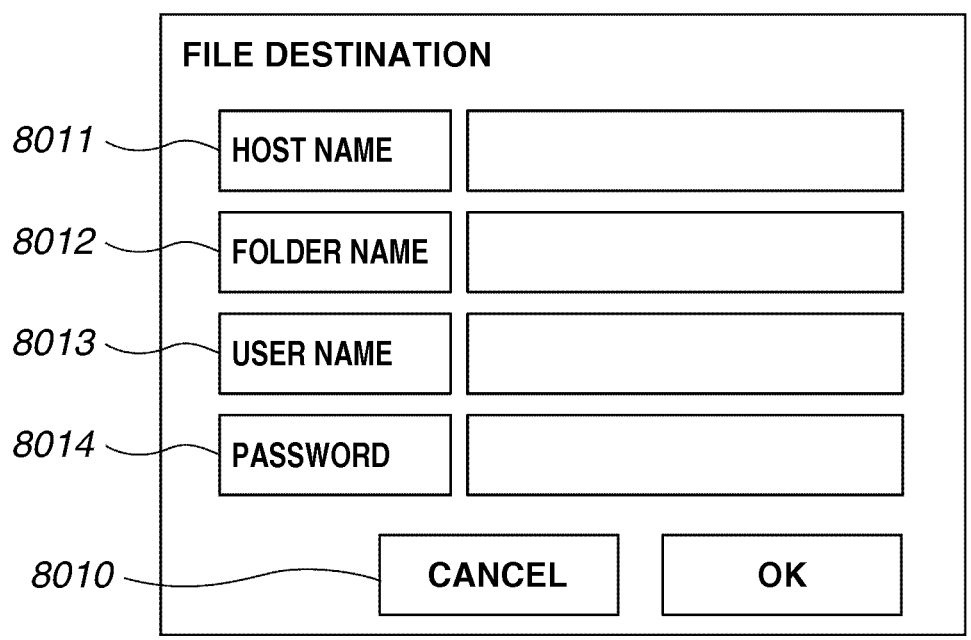
FIG. 14 is an input screen for a file transmission destination.

If the transmission protocol is selected on the screen in FIG. 13, an input screen for a file destination illustrated in FIG. 14 is displayed on the LCD display unit 2013.

In step S1201, the operation unit component 3001 determines whether a key input is performed by the user of the copying machine 1001. If the operation unit component 3001 determines that a key input is performed (YES in step S1201), the processing proceeds to step S1202.

In step S1202, the operation unit component 3001 determines whether the input key is a cancel key 8010. If the operation unit component 3001 determines that the input key is the cancel key 8010 (YES in step S1202), the processing in FIG. 12 is ended. If the operation unit component 3001 determines that the input key is not the cancel key 8010 (NO in step S1202), the processing proceeds to step S1203.

In step S1203, the operation unit component 3001 determines whether the input key is a soft key. If the operation unit component 3001 determines that the input key is the soft key (YES in step S1203), the processing proceeds to step S1204. If the operation unit component 3001 determines that the input key is not the soft key (NO in step S1203), the processing proceeds to step S1205.

The soft key refers to buttons such as "a", "b", and others (same as those illustrated in FIG. 10) displayed on a screen (not illustrated) displayed by inputting keys 8011 to 8014 in FIG. 14. The user presses these buttons to cause the operation unit component 3001 to notify the database storage component 3007 of the code corresponding to the pressed button ("a" for example) via the transmission management component 3003.

In step S1204, the operation unit component 3001 notifies the database storage component 3007 of the code corresponding to the soft key input in step S1203 via the transmission management component 3003. The database storage component 3007 adds the code of which the operation unit component 3001 notifies the database storage component 3007 to the end of a transmission address 904 illustrated in FIG. 9.

The transmission address 904 is stored in the RAM 2002. The transmission address stored in the transmission address 904 is displayed on the field 802 in FIG. 8. If an electronic mail or other addresses for transmitting files are already input in field 802, other fields (not illustrated) may be provided under field 802 to display an address for transmitting a file stored in the transmission address 904.

In step S1205, the operation unit component 3001 determines whether the input key is the start key 2014. If the operation unit component 3001 determines that the input key is the start key 2014 (YES in step S1205), the processing proceeds to step S1206. If the operation unit component 3001 determines that the input key is not the start key 2014 (NO in step S1205), the processing corresponding to the input key is executed in step S1209.

In step S1206, the database storage component 3007 determines whether a file can be transmitted. If the database storage component 3007 determines that a file can be transmitted (YES in step S1206), the processing proceeds to step S1207.

More specifically, the database storage component 3007 determines whether the transmission address 904 stored in the RAM 2002 stores no code (empty). If no code is stored, the database storage component 3007 determines that a file cannot be transmitted.

Other information may be used as a condition for determining whether a file can be transmitted. It can be determined that a file cannot be transmitted in a case where a document is not placed on the scanner 2070, for example. Alternatively, the state of the network I/F 2010 is determined and if the network I/F 2010 is not connected to the LAN 1006, it can be determined that a file cannot be transmitted.

In step S1207, the database storage component 3007 instructs the scanner component 3004 to cause the scanner 2070 to read a document via the transmission management component 3003. The scanner 2070 reads the document to acquire image data and causes the image buffer 902 of the RAM 2002 to store the acquired image data.

In step S1208, the database storage component 3007 causes the image compression unit 2040 to compress the image data stored in the image buffer 902 to the image data in a predetermined format (PDF format, for example), and transmits the compressed data to the transmission address 904. The image compression unit 2040 may be controlled so that the user can optionally select the format of image data such as PDF, JPEG, and others, and change data to those in the selected format.

Figure 12:
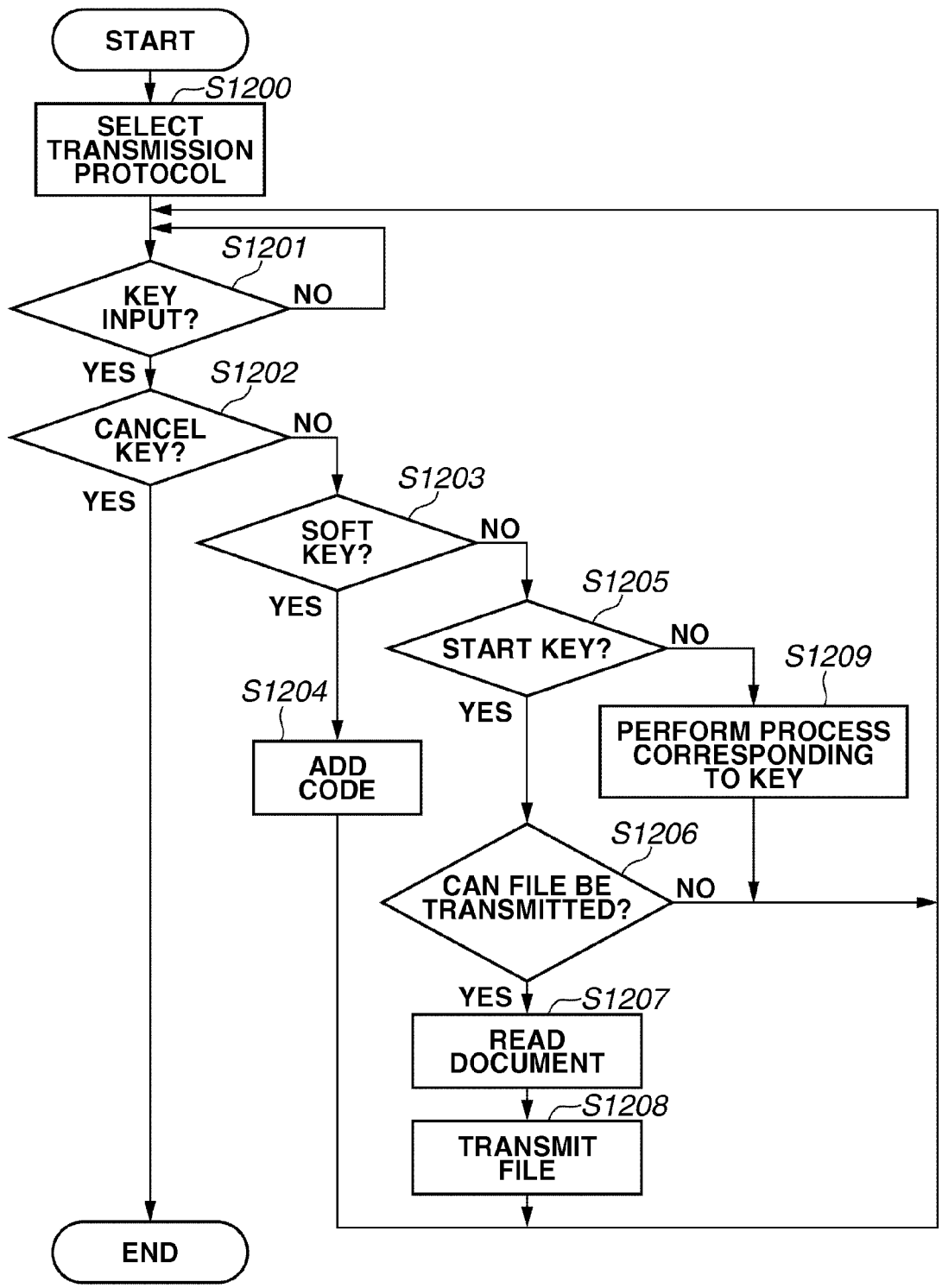
FIG. 12 is a flow chart executed in a case where a file button 603 is specified by the user.

In the transmission process in the facsimile communication system by the facsimile transmission component 3006, although the transmission address number 901 in the RAM 2002 is deleted after the facsimile is transmitted, such deletion is not performed in the process in FIG. 12. For this reason, if the processing is returned to step S1201 from step S1208 and the start key 2014 is input, a file can be transmitted to the transmission address 904 which is kept stored even after the transmission process is ended.

The reason why the file transfer communication system is configured not to delete the transmission address 904 is that communication using the file transfer communication system can prevent a file from being transmitted to an address inappropriate for destination by an in-house server restricting transmission.

As described above, the facsimile transmission component 3006 controls the RAM 2002 so as to delete the transmission address number 901 stored in the RAM 2002 from the RAM 2002 after transmission. On the other hand, mail/I facsimile transmission component 3008 controls the RAM 2002 so as to keep the transmission address 904 stored in the RAM 2002 without deleting the transmission address 904 from the RAM 2002 after transmission. The database storage component 3007 operates in a similar manner as the mail/I facsimile transmission component 3008.

Thus, the start key 2014 is input again into the address information (transmission address number) associated with the facsimile communication system to enable preventing image data from being transmitted to the address to which the image data are already transmitted when the image data are transmitted again. Accordingly, the image data which have to be made secret can be prevented from being leaked due to the erroneous transmission of image data to the same address as that of the previous transmission.

On the other hand, the electronic mail communication system and the file transfer communication system are capable of performing transmission to the transmission address 904 kept stored even after the transmission process is ended.

A second exemplary embodiment of the present invention is described below.

In the first exemplary embodiment, the transmission address number 901 for the facsimile communication system and the transmission address 904 for the electronic mail communication system or the file transfer communication system are stored in the RAM 2002, and the transmission process (multi-address transmission) is executed. Then, the transmission address number 901 is deleted from the RAM 2002, but the transmission address 904 is not deleted therefrom.

In the second exemplary embodiment, the transmission address number 901 for the facsimile communication system and the transmission address 904 for the electronic mail communication system or the file transfer communication system are stored in the RAM 2002 and the transmission process (multi-address transmission) is executed. Then, both of the transmission address number 901 and the transmission address 904 are deleted from the RAM 2002.

The second exemplary embodiment can prevent the number of addresses for the multi-address transmission from being decreased at the time of transmission to the same address as that of the previous transmission.

The process executed by the operation unit component 3001, the transmission management component 3003, and the facsimile transmission component 3006 in a case where the facsimile button 604 is specified by the user on the screen in FIG. 6 is similar to that in the flow chart in FIG. 7, so that further description thereof is omitted herein.

The process executed by the operation unit component 3001, the transmission management component 3003, and the mail/I facsimile transmission component 3008 in a case where the electronic mail button 601 is specified by the user on the screen in FIG. 6 is described below referring to the flow chart in FIG. 15.

Figure 15:
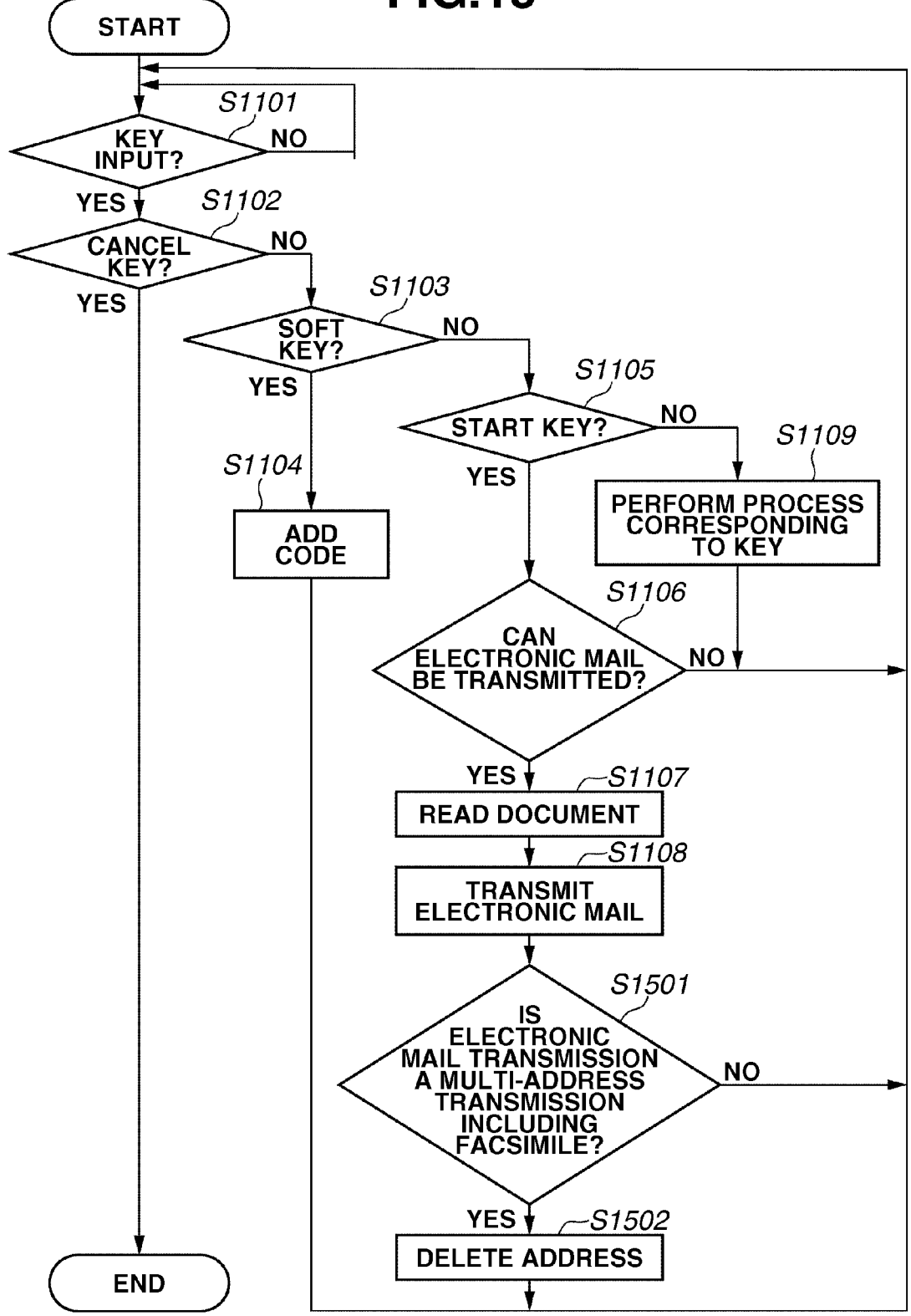
FIG. 15 is a flow chart executed in a case where the electronic mail button 601 is specified by the user.

The flow chart in FIG. 15 is an example of a modification of that in FIG. 11. Since steps 1101 to 1109 are similar to those having the same reference signs in the flow chart in FIG. 11, description thereof is omitted herein. The flow chart in FIG. 15 is different from that in FIG. 11 in that steps S1501 and S1502 are added to FIG. 11. Those steps are described below.

In step S1501, the transmission management component 3003 determines whether the electronic mail transmission process in step S1108 is a multi-address transmission including a facsimile. More specifically, the transmission management component 3003 determines whether a facsimile number is stored in the transmission address number 901 when the start key 2014 is pressed in step S1105 and a facsimile is transmitted to the facsimile number in step S708 in FIG. 7. If the determination is "YES," the processing proceeds to step S1502. If the determination is "NO," the processing returns to step S1101.

In step S1502, the mail/I facsimile transmission component 3008 deletes the code stored in the transmission address 904 from the RAM 2002.

The process executed by the operation unit component 3001, the transmission management component 3003, and the database storage component 3007 in a case where the file button 603 is specified by the user on the screen in FIG. 6 is described below referring to the flow chart in FIG. 16.

Figure 16:
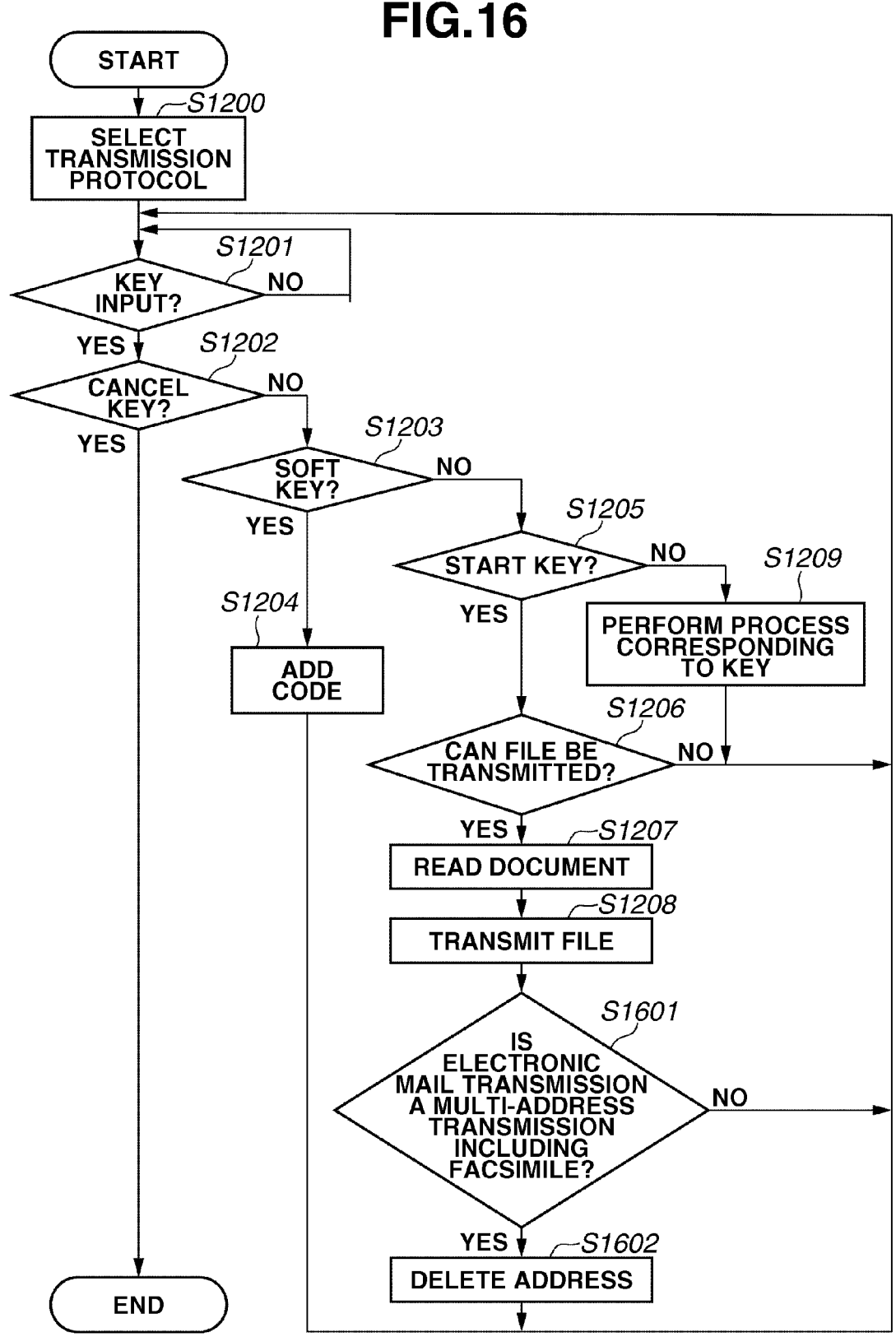
FIG. 16 is a flow chart executed in a case where the file button 603 is specified by the user.

The flow chart in FIG. 16 is an example of a modification of that in FIG. 12. Since steps 1200 to 1209 are similar to those having the same reference signs in the flow chart in FIG. 12, description thereof is omitted herein. The flow chart in FIG. 16 is different from that in FIG. 12 in that steps S1601 and S1602 are added to FIG. 12. Those steps are described below.

In step S1601, the transmission management component 3003 determines whether the file transmission process in step S1208 is a multi-address transmission including a facsimile. More specifically, the transmission management component 3003 determines whether the facsimile number is stored in the transmission address number 901 when the start key 2014 is pressed in step S1205 and a facsimile is transmitted to the facsimile number in step S708 in FIG. 7. If the determination is "YES," the processing proceeds to step S1602. If the determination is "NO," the processing returns to step S1201.

In step S1602, the database storage component 3007 deletes the code stored in the transmission address 904 from the RAM 2002.

As described above, in the second exemplary embodiment, the transmission address number 901 for the facsimile communication system and the transmission address 904 for the electronic mail communication system or the file transfer communication system are stored in the RAM 2002 and the transmission process (multi-address transmission) is executed. Then, both of the transmission address number 901 and the transmission address 904 are deleted from the RAM 2002.

The second exemplary embodiment can prevent the number of addresses for the multi-address transmission from being decreased at the time of transmission to the same address as that of the previous transmission.

In the first exemplary embodiment, the transmission address 904 for the electronic mail communication system is stored in the RAM 2002 and the transmission process is executed. The, the transmission address 904 is not deleted therefrom.

However, it is desirable to delete the address even for the electronic mail communication system from the RAM 2002 if the address is low in reliability.

In a third exemplary embodiment, the transmission address 904 is deleted from the RAM 2002 so that the address low in reliability even for the electronic mail communication system is not used as the same address as that of the previous transmission. According to third exemplary embodiment, it is possible not to use the address low in reliability even for the electronic mail communication system as re-transmission.

The process executed by the operation unit component 3001, the transmission management component 3003, and the facsimile transmission component 3006 in a case where the facsimile button 604 is specified by the user on the screen in FIG. 6 is similar to that in the flow chart in FIG. 7, so that description thereof is omitted herein.

The process executed by the operation unit component 3001, the transmission management component 3003, and the database storage component 3007 in a case where the file button 603 is specified by the user on the screen in FIG. 6 is similar to that in the flowchart in FIG. 12, so that description thereof is omitted herein.

The process executed by the operation unit component 3001, the transmission management component 3003, and the mail/I facsimile transmission component 3008 in a case where the electronic mail button 601 is specified by the user on the screen in FIG. 6 is described below referring to the flow chart in FIG. 17.

Figure 17:
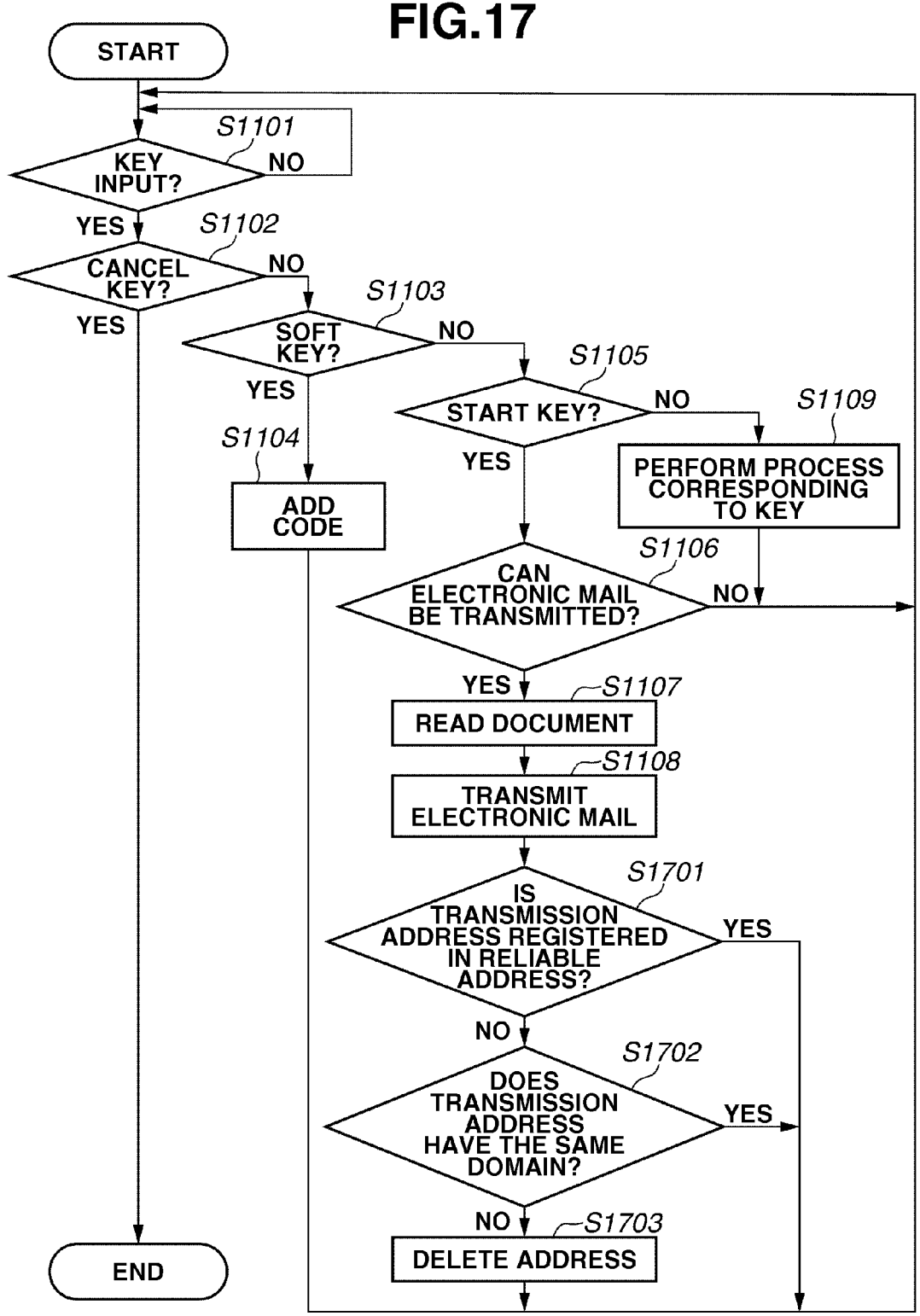
FIG. 17 is a flow chart executed in a case where the electronic mail button 601 is specified by the user.

The flow chart in FIG. 17 is an example of a modification of that in FIG. 11. Since steps 1101 to 1109 are similar to those having the same reference signs in the flow chart in FIG. 11, description thereof is omitted herein. The flow chart in FIG. 17 is different from that in FIG. 11 in that steps S1701, S1702, and S1703 are added to FIG. 11. Those steps are described below.

In step S1701, the mail/I facsimile transmission component 3008 determines whether the transmission address 904 used for the electronic mail transmission process in step S1108 is already registered as a reliable address. The reliable address is registered by the user via the screen illustrated in FIG. 18 and the registered transmission address is stored in the RAM 2002.

In step S1702, the mail/I facsimile transmission component 3008 determines whether the transmission address 904 used for the electronic mail transmission process in step S1108 has the same domain as that to which the copying machine 1001 belongs. If the transmission address 904 has the same domain (YES in step S1702), the processing proceeds to step S1101. If the transmission address 904 does not have the same domain (NO in step S1702), the processing proceeds to step S1703.

In step S1703, the mail/I facsimile transmission component 3008 deletes the code stored in the transmission address 904 from the RAM 2002.

Thus, in the third exemplary embodiment, the transmission address 904 is deleted from the RAM 2002 so that the address low in reliability even for the electronic mail communication system is not used for re-transmission. According to third exemplary embodiment, it is possible not to use the address low in reliability even for the electronic mail communication system as re-transmission.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-117460 filed May 21, 2010, which is hereby incorporated by reference herein in its entirety.

What is claimed is:

1. A communication apparatus comprising:
    an input unit configured to input image data;
    a setting unit configured to set, according to user's setting operation, a transmission address corresponding to one of a plurality of types of transmission protocols;
    a storage unit configured to store the transmission address set by the setting unit;
    a reception unit configured to receive a transmission instruction;
    a transmission unit configured to transmit, in response to reception of a first transmission instruction by the reception unit, first image data input by the input unit to the transmission address set by the setting unit in accordance with a type of transmission protocol corresponding to the set transmission address; and
    a control unit configured to control the transmission unit to transmit, in response to reception of a second transmission instruction by the reception unit, second image data input by the input unit to the set transmission address which is stored in the storage unit,
    wherein, in a case where the transmission address set by the setting unit corresponds to a first type of transmission protocol, the control unit deletes the transmission address which is stored in the storage unit such that the second image data cannot be transmitted without setting a transmission address, and
    wherein, in a case where the transmission address set by the setting unit corresponds to a second type of transmission protocol, the storage unit keeps storing the transmission address set by the setting unit after the transmission unit transmits the first image data input by the input unit to the transmission address set by the setting unit in response to the reception of the first transmission instruction by the reception unit.

2. The communication apparatus according to claim 1, wherein the setting unit sets a plurality of transmission addresses corresponding to transmission protocols different from one another, wherein, in response to the reception of the first transmission instruction by the reception unit, the control unit controls the transmission unit to transmit the first image data input by the input unit to the plurality of transmission addresses, and wherein, in response to at least one of the plurality of transmission addresses set by the setting unit corresponding to the first type of transmission protocol, the control unit controls the transmission unit such that the second image data cannot be transmitted without setting a transmission address.

3. The communication apparatus according to claim 1, wherein the first type of transmission protocol is a facsimile transmission protocol and the second type of transmission protocol is an electronic mail transmission protocol or a file transfer protocol.

4. The communication apparatus according to claim 1, wherein the control unit controls the transmission unit to transmit, without further user's setting operation, image data to the set transmission address in response to the reception of the second transmission instruction by the reception unit, in a case where the transmission address set by the setting unit corresponds to an electronic mail transmission protocol or a file transfer protocol.

5. A method for controlling a communication apparatus including a transmission unit configured to transmit input image data, using any of a plurality of types of transmission protocols, the method comprising:

inputting first image data;

setting, according to user's setting operation, a transmission address corresponding to one of the plurality of types of transmission protocols;

storing the set transmission address in a storage unit;

receiving a first transmission instruction;

controlling the transmission unit to transmit, in response to reception of the first transmission instruction, the input first image data to the set transmission address in accordance with a type of transmission protocol corresponding to the set transmission address;

inputting second image data;

receiving a second transmission instruction;

controlling the transmission unit to transmit, in response to reception of the second transmission instruction, the input second image data to the set transmission address which is stored in the storage unit, wherein, in a case where the set transmission address corresponds to a first type of transmission protocol, controlling includes deleting the transmission address which is stored in the storage unit such that the second image data cannot be transmitted without setting a transmission address, and wherein, in a case where the set transmission address corresponds to a second type of transmission protocol, the storage unit keeps storing the set transmission address after the transmission unit transmits the input first image data to the set transmission address in response to the reception of the first transmission instruction.

6. A non-transitory computer-readable storage medium storing a program causing a communication apparatus including a transmission unit configured to transmit input image data, using any of a plurality of types of transmission protocols, to perform a method, the method comprising:

inputting first image data;

setting, according to user's setting operation, a transmission address corresponding to one of the plurality of types of transmission protocols;

storing the set transmission address in a storage unit;

receiving a first transmission instruction;

controlling the transmission unit to transmit, in response to reception of the first transmission instruction, the input first image data to the set transmission address in accordance with a type of transmission protocol corresponding to the set transmission address;

inputting second image data;

receiving a second transmission instruction;

controlling the transmission unit to transmit, in response to reception of the second transmission instruction, the input second image data to the set transmission address which is stored in the storage unit, wherein, in a case where the set transmission address corresponds to a first type of transmission protocol, controlling includes deleting the transmission address which is stored in the storage unit such that the second image data cannot be transmitted without setting a transmission address, and wherein, in a case where the set transmission address corresponds to a second type of transmission protocol, the storage unit keeps storing the set transmission address after the transmission unit transmits the input first image data to the set transmission address in response to the reception of the first transmission instruction.

7. The communication apparatus according to claim 1, wherein the input unit is a scanner for scanning an original and input image data corresponding to the original.

8. The communication apparatus according to claim 1, wherein the reception unit receives the first transmission instruction and the second transmission instruction input by a user via an operation unit.

9. A communication apparatus comprising:

an input unit configured to input image data;

a setting unit configured to allow a user to set a first transmission address for a first type of communication protocol or to set a second transmission address for a second type of communication protocol;

a storage unit configured to store the first transmission address or the second transmission address;

a transmission unit configured to transmit, in a case where the first transmission address is set by the setting unit, the image data to the first transmission address in accordance with the first type of communication protocol, and configured to transmit, in a case where the second transmission address is set by the setting unit, the image data to the second transmission address in accordance with the second type of communication protocol; and a deletion unit configured to delete, in a case where the first transmission address is set by the setting unit, the first transmission address stored in the storage unit such that other image data input by the input unit cannot be transmitted by the transmission unit without setting a transmission address by the setting unit, wherein, in a case where the second transmission address is set by the setting unit, the second transmission address remains in the storage unit in order to transmit the other image data to the second transmission address.

10. The communication apparatus according to claim 9, wherein the setting unit is configured to set both the first transmission address and the second transmission address, and wherein, in a case where both the first transmission address and the second transmission address are set by the setting unit, the deletion unit is configured to delete both the first transmission address and the second transmission address stored in the storage unit.

11. The communication apparatus according to claim 9, wherein, in response to input of a transmission instruction, the transmission unit is configured to transmit the image data to the first transmission address or the second transmission address.

12. The communication apparatus according to claim 9, further comprising a display unit configured to display the first or second transmission address.

13. The communication apparatus according to claim 9, wherein the transmission unit is configured not to transmit the image data in a case where it is determined that the storage unit does not store a transmission address.

14. The communication apparatus according to claim 9, wherein the second transmission address remains in the storage unit in order to transmit the other image data to the second transmission address, based on that the second transmission address is determined to be reliable.

15. The communication apparatus according to claim 9,
wherein the first type of communication protocol is a facsimile transmission protocol, and
wherein the transmission unit is configured to transmit, in a case where the first transmission address is set, the image data compressed in a facsimile format to the first transmission address via a public line.

16. The communication apparatus according to claim 9,
wherein the second type of communication protocol is an electronic mail transmission protocol, and
wherein the transmission unit is configured to transmit, in a case where the second transmission address is set, the image data as a file attached to an e-mail to the second transmission address.

17. The communication apparatus according to claim 9,
wherein the second type of communication protocol is a file transfer protocol, and
wherein the transmission unit is configured to transmit, in a case where the second transmission address is set, a file into which the image data is converted in accordance with a file format selected by the user to the second transmission address.

18. The communication apparatus according to claim 17,
wherein the file transfer protocol is a Web-based Distributed Authoring and Versioning (WEBDAV), a Server Message Block (SMB), or a File Transfer Protocol (FTP).

19. The communication apparatus according to claim 9, wherein the input unit is a scanner for reading a document to acquire image data.

20. The communication apparatus according to claim 9, wherein the storage unit is a Random Access Memory (RAM) for temporarily storing the first or second transmission address.

21. A method for controlling a communication apparatus, the method comprising:
inputting image data;
allowing a user to set a first transmission address for a first type of communication protocol or to set a second transmission address for a second type of communication protocol;
storing the first transmission address or the second transmission address;
transmitting, in a case where the first transmission address is set, the image data to the first transmission address in accordance with the first type of communication protocol, and transmitting, in a case where the second transmission address is set, the image data to the second transmission address in accordance with the second type of communication protocol; and
deleting, in a case where the first transmission address is set, the stored first transmission address such that other input image data cannot be transmitted without setting a transmission address,
wherein, in a case where the second transmission address is set, the stored second transmission address remains in order to transmit the other image data to the second transmission address.

22. A non-transitory computer readable storage medium storing a program to cause a communication apparatus to perform the method according to claim 21.

23. A communication apparatus comprising:
a data input unit configured to input image data;
a user input unit configured to allow a user to input a transmission address corresponding to a first type of communication protocol or a second type of communication protocol;
a transmission unit configured to, in a case where the transmission address input by the user corresponds to the first type of communication protocol, transmit the image data input by the data input unit to the transmission address and subsequently transmit, after the user inputs a new transmission address, other image data input by the data input unit to the new transmission address, and configured to, in a case where the transmission address input by the user corresponds to the second type of communication protocol, transmit the image data input by the data input unit to the transmission address and transmit other image data input by the data input unit to the transmission address without the user input inputting a new transmission address.

24. The communication apparatus according to claim 23,
wherein the user input unit is configured to input both a first transmission address corresponding to the first type of communication protocol and a second transmission address corresponding to the second type of communication protocol, and
wherein, in a case where both the first transmission address and the second transmission address are input by the user input unit, the transmission unit transmits the image data input by the data input unit and subsequently transmits, after the user inputs a new transmission address, other image data input by the data input unit to the new transmission address.

25. The communication apparatus according to claim 23, wherein the transmission unit is configured to transmit the image data in response to reception of a transmission instruction and transmit the other image data in response to reception of a transmission instruction.

26. The communication apparatus according to claim 23, further comprising:
a storage unit configured to store the transmission address input by the user; and
a display unit configured to display the transmission address stored in the storage unit.

27. The communication apparatus according to claim 26, wherein the transmission unit is configured not to transmit the image data in a case where it is determined that the storage unit does not store the transmission address.

28. The communication apparatus according to claim 23, wherein, in a case where it is determined that the transmission address input by the user corresponds to the second type of communication protocol and that the transmission address is reliable, the transmission unit transmits the image data input by the data input unit to the transmission address and transmits other image data input by the data input unit to the transmission address without the user inputting a new transmission address.

29. The communication apparatus according to claim 23, wherein the first type of communication protocol is a facsimile transmission protocol, and
wherein the transmission unit is configured to transmit, in a case where the transmission address input by the user corresponds to the first type of communication protocol, the image data compressed in a facsimile format to the transmission address via a public line.

30. The communication apparatus according to claim 23, wherein the second type of communication protocol is an electronic mail transmission protocol, and
wherein the transmission unit is configured to transmit, in a case where the transmission address input by the user corresponds to the second type of communication protocol, the image data as a file attached to an e-mail to the transmission address.

31. The communication apparatus according to claim 23, wherein the second type of communication protocol is a file transfer protocol, and
wherein the transmission unit is configured to transmit, in a case where the transmission address input by the user corresponds to the second type of communication protocol, a file into which the image data is converted in accordance with a file format selected by the user to the transmission address.

32. The communication apparatus according to claim 31, wherein the file transfer protocol is a Web-based Distributed Authoring and Versioning (WEBDAV), a Server Message Block (SMB), or a File Transfer Protocol (FTP).

33. The communication apparatus according to claim 23, wherein the data input unit is a scanner for reading a document to acquire image data.

34. The communication apparatus according to claim 9, wherein the storage unit is a Random Access Memory (RAM) for temporarily storing the first or second transmission address.

35. A method for controlling a communication apparatus, the method comprising:
inputting image data;
allowing a user to input a transmission address corresponding to a first type of communication protocol or a second type of communication protocol;
in a case where the transmission address input by the user corresponds to the first type of communication protocol, transmitting the input image data to the transmission address and subsequently transmitting, after the user inputs a new transmission address, other input image data to the new transmission address, and
in a case where the transmission address input by the user corresponds to the second type of communication protocol, transmitting the input image data to the transmission address and transmitting other input image data to the transmission address without the user inputting a new transmission address.

36. A non-transitory computer readable storage medium storing a program to cause a communication apparatus to perform the method according to claim 35.

37. A data transmission apparatus comprising:
a data input unit configured to input image data;
a user input unit configured to allow a user to input a first transmission address corresponding to a first type of communication protocol or a second transmission address corresponding to a second type of communication protocol;
a first transmission unit configured to transmit the image data input by the data input unit to the first transmission address by the first type of communication protocol, and then transmit other image data input by the data input unit to the first transmission address by the first type of communication protocol if the first transmission address is input again; and
a second transmission unit configured to transmit the image data input by the data input unit to the second transmission address by the second type of communication protocol, and then transmit the other image data input by the data input unit to the second transmission address by the second type of communication protocol even if the second transmission address is not input again.

38. The data transmission apparatus according to claim 37, wherein the user input unit is configured to input both the first transmission address corresponding to the first type of communication protocol and the second transmission address corresponding to the second type of communication protocol, and
wherein, in a case where both the first transmission address and the second transmission address are input by the user input unit, the second transmission unit transmits the other image data to the second transmission address by the second type of communication protocol if the second transmission address is input again.

39. The data transmission apparatus according to claim 37, wherein the first transmission unit and the second transmission unit are configured to transmit the image data in response to reception of a transmission instruction and transmit the other image data in response to reception of a transmission instruction.

40. The data transmission apparatus according to claim 37, wherein the first type of communication protocol is a facsimile transmission protocol, and
wherein the first transmission unit is configured to transmit the image data to the first transmission address via a public line.

41. The data transmission apparatus according to claim 37, wherein the second type of communication protocol is an electronic mail transmission protocol, and
wherein the second transmission unit is configured to transmit the image data as a file attached to an e-mail to the second transmission address.

42. The data transmission apparatus according to claim 37, wherein the second type of communication protocol is a file transfer protocol, and
wherein the second transmission unit is configured to transmit to the second transmission address a file into which the image data is converted in accordance with a file format selected by the user.

43. The data transmission apparatus according to claim 42, wherein the file transfer protocol is a Web-based Distributed Authoring and Versioning (WEBDAV), a Server Message Block (SMB), or a File Transfer Protocol (FTP).

44. The data transmission apparatus according to claim 37, wherein the data input unit is a scanner for reading a document to acquire image data.

45. A method for controlling a data transmission apparatus, the method comprising:
inputting first image data and second image data;

allowing a user to input a first transmission address corresponding to a first type of communication protocol or a second transmission address corresponding to a second type of communication protocol;

transmitting the first image data to the first transmission address by the first type of communication protocol, and then transmitting the second image data to the first transmission address by the first type of communication protocol if the first transmission address is input again; and transmitting the first image data to the second transmission address by the second type of communication protocol, and then transmitting the second image data to the second transmission address by the second type of communication protocol even if the second transmission address is not input again.

46. A non-transitory computer readable storage medium storing a program to cause a data transmission apparatus to perform the method according to claim 45.

47. A data transmission apparatus comprising:
an obtaining unit configured to obtain data;
a first transmission unit configured to transmit the data by using a first type of protocol;
a second transmission unit configured to transmit the data by using a second type of protocol;
an input unit configured to input a transmission address for transmitting the data;
a setting unit configured to automatically set a transmission address which is used at a previous transmission; and
a control unit configured to enable a function of the setting unit in a case where the previous transmission is executed by the first transmission unit, and to disable the function of the setting unit in a case where the previous transmission is executed by the second transmission unit.

48. The data transmission apparatus according to claim 47, wherein the obtaining unit is a scanner for scanning a document.

49. The data transmission apparatus according to claim 47, wherein the first type of protocol is a facsimile transmission protocol.

50. The data transmission apparatus according to claim 47, wherein the second type of protocol is an electronic mail transmission protocol.

51. The data transmission apparatus according to claim 47, wherein the second type of communication protocol is a file transfer protocol.

52. The data transmission apparatus according to claim 51, wherein the file transfer protocol is a Web-based Distributed Authoring and Versioning (WEBDAV), a Server Message Block (SMB), or a File Transfer Protocol (FTP).

53. A method for controlling a data transmission apparatus, the method comprising:
obtaining data;
transmitting the data by using a first type of protocol;
transmitting the data by using a second type of protocol;
inputting a transmission address for transmitting the data; and
setting, automatically, a transmission address which is used at a previous transmission,
wherein a function of the setting is enabled in a case where the previous transmission is executed by the first type of protocol, and the function of the setting is disabled in a case where the previous transmission is executed by the second type of protocol.

54. A non-transitory computer readable storage medium storing a program to cause a data transmission apparatus to perform the method according to claim 53.

* * * * *